United States Patent Office 3,207,828
Patented Sept. 21, 1965

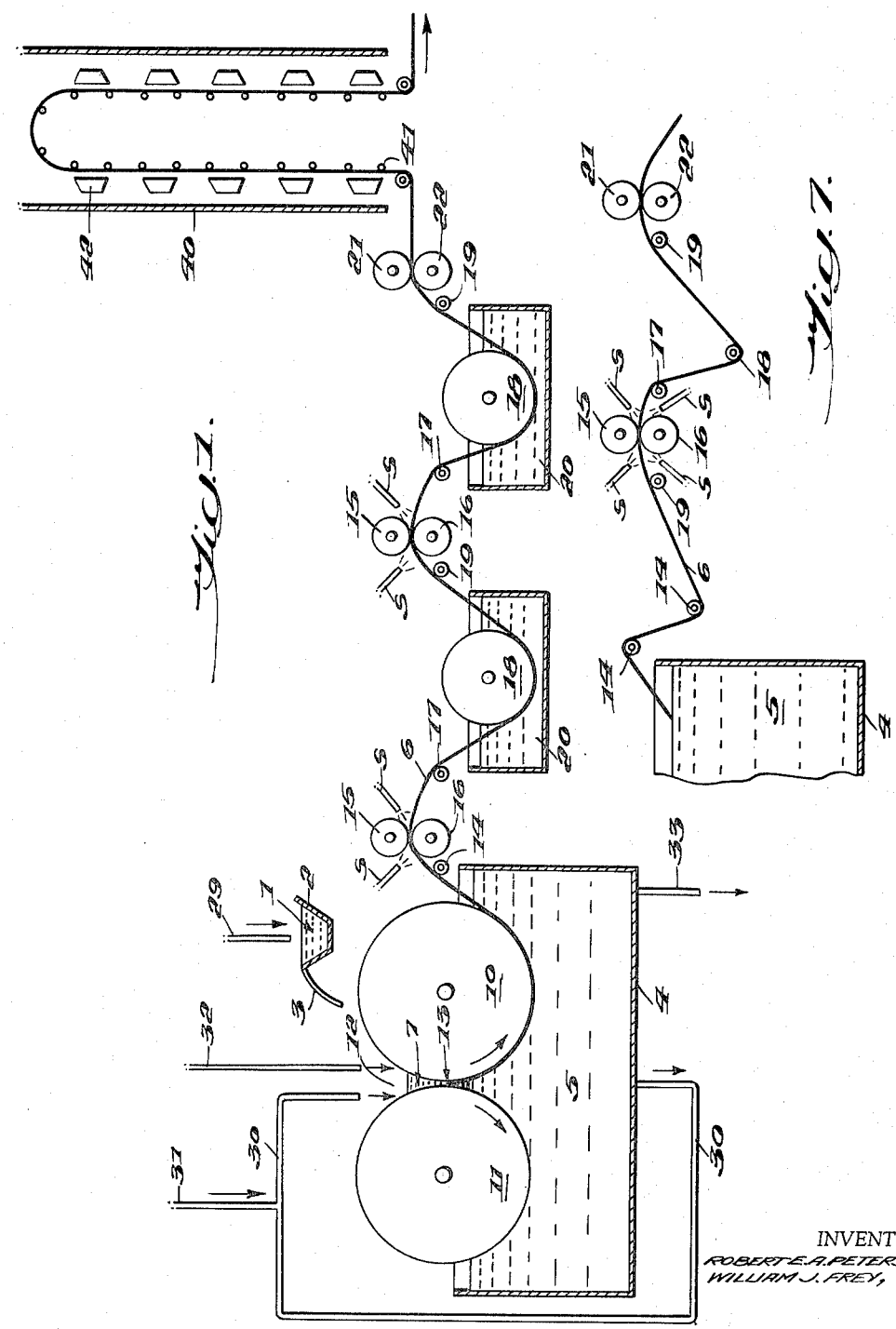

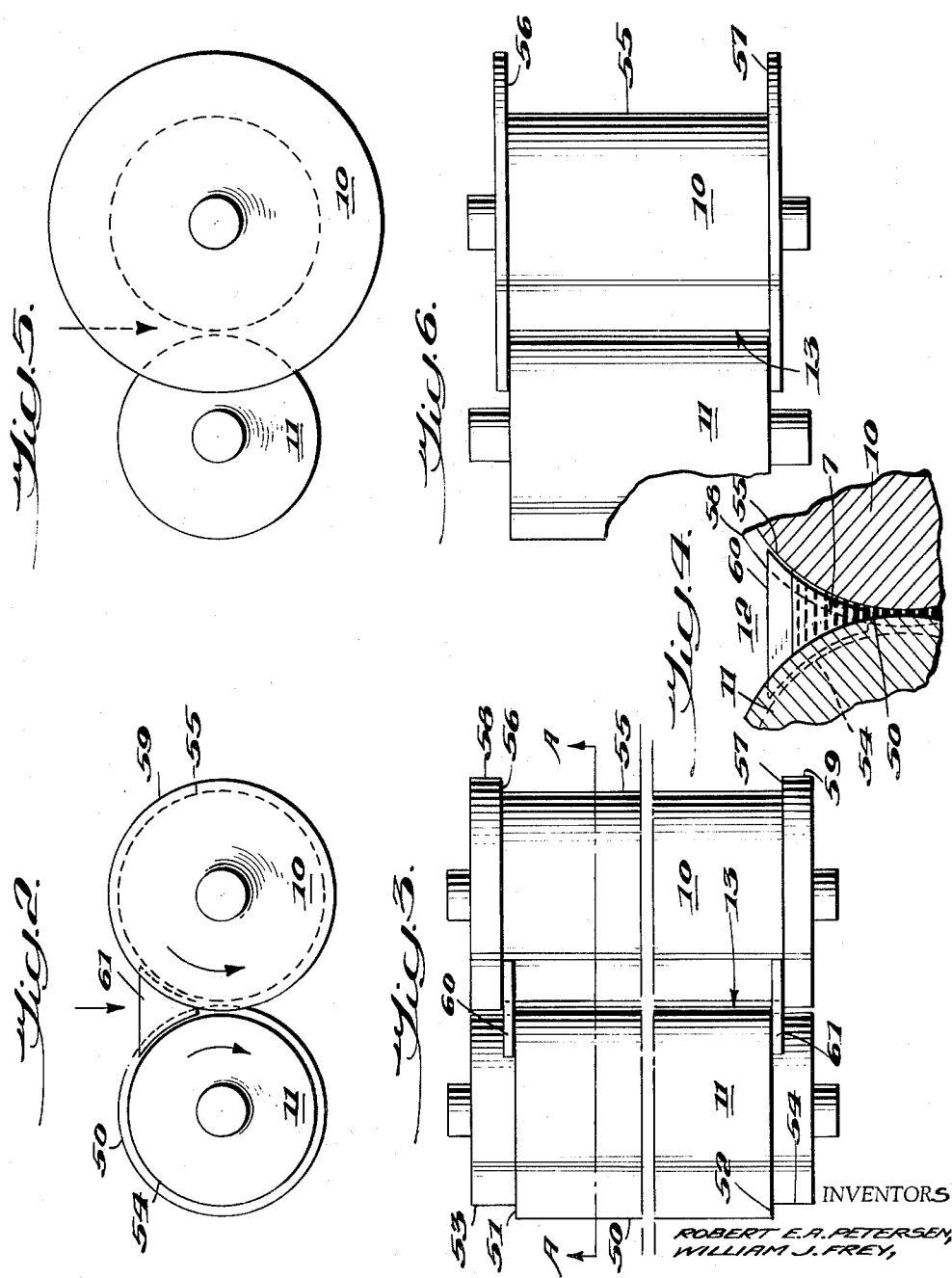

3,207,828
PROCESS FOR ISOLATING CHLOROPRENE POLYMERS FROM AQUEOUS DISPERSIONS THEREOF
Robert E. A. Petersen and William Joseph Frey, Louisville, Ky., assignors to E. I. du Pont de Nemours and Company, Wilmington, Del., a corporation of Delaware
Filed July 10, 1962, Ser. No. 208,815
6 Claims. (Cl. 264—175)

This invention relates to a new process for isolating chloroprene polymers from aqueous dispersions thereof, which process enables said polymers to be obtained in the form of continuous plastic structures. This invention further relates to subsequent process steps for washing and drying these structures and thus making them ready for fabrication by conventional rubber-working machinery.

The usual methods for isolating natural and synthetic rubbers from their aqueous dispersions (lattices) in a dry form suitable for further manufacturing operations are not directly applicable to polymers of chloroprene for the reason that chloroprene polymer as ordinarily coagulated forms large, impervious masses from which it is impossible or impractical to remove coagulants or dispersing agents (or other electrolytes formed from them), which are harmful in the final product.

One process used to avoid this difficulty involves freezing the polymer latex in thin layers, thus giving, after melting of the ice crystals, a porous coagulum which is easily washed free of remaining electrolytes and then dried with heated air. See U.S. Patent No. 2,187,146. Another process is to make the chloroprene polymers in a dispersion in which the emulsifying agent is an ammonium salt and to isolate the polymer from it by heating to boil off the water and to decompose the ammonium salts, leaving the corresponding acids, which are usually harmless, remaining in the dry polymer. See U.S. Patent No. 2,914,497. The first of these processes has the disadvantage of rather high operating costs because of the refrigeration and additional chemicals required. The second is rather limited as to the emulsifying agents which can be used.

A third process, described in U.S. Patent No. 2,371,722, is to mix the dispersion and coagulating agent, usually a salt solution, and then extrude the resulting coagulated mass, under pressure produced by a helical worm rotating in a suitable housing, through small openings, thus squeezing out part of the water and dissolved salts. The washing is continued by similar extrusions with fresh water and finally most of the remaining water is removed by a last extrusion. This process has the disadvantage of requiring heavy equipment and high power input, which are costly, and of causing high temperatures which may damage the product.

Still another process is to extrude the latex in a fine stream, preferably through a narrow slit forming a thin ribbon, into a coagulating bath, thus forming a continuous thin sheet of coagulum which is then washed and dried like the continuous thin sheet made by freezing in the first method described above. Thin films only can be satisfactorily made and adequately washed by this method, but serious and apparently unavoidable difficulties are caused by plugging of the slit by coagulum. A process which is cheaper, more efficient, and more generally applicable than any of the above is therefore needed.

It is therefore an object of this invention to provide an improved process for isolating chloroprene polymer from aqueous dispersions thereof and to enable said polymer to be obtained in the form of a continuous plastic structure. It is a particular object to accomplish this isolation by coagulation of said aqueous dispersion through a narrow opening or slit formed by converging, moving wall members, but preferably through the nip between two rolls.

Another object of this invention is to perform subsequent operations on said continuously obtained plastic structure to obtain a dry product which is suitable for fabricating operations. Another specific object of this invention is to provide a continuous process for removing undesired impurities from said plastic structure without disruption of said structure. Other objects will appear hereinafter.

These and other objects are accomplished by the process which comprises contacting a latex containing a plastic chloroprene polymer with a coagulating solution and passing the mixture resulting from the contacting step through a slit formed by two cylindrical members horizontally spaced to form a narrow opening at the nip therebetween and rotating in opposite directions, both in the direction of flow of said mixture. The contacting and passing steps are preferably performed simultaneously. The movement of the mixture through the slit is brought about by the friction between the coagulum and the rotating members. To increase this friction, said members are preferably roughened. By the foregoing coagulating steps, chloroprene polymer in the form of a continuous plastic structure is obtainable.

Also within the scope of the present invention are subsequent operations to convert said plastic structure into a product which can be fabricated by conventional rubber-working machinery. This is accomplished by washing the plastic structure free of undesired impurities and by thereafter drying the structure. These operations are preferably performed continuously and in-line with the coagulating steps and without altering the general configuration of the plastic structure obtained. In the preferred embodiment, the washing procedure consists essentially of repeatedly squeezing the plastic structure obtained from the coagulating steps and alternately contacting said plastic structure with water.

The process of the present invention will be better understood by reference to the drawings, the description of which are as follows:

FIGURE 1 is a schematic diagram of the overall process of this invention, showing the steps from coagulating a chloroprene polymer latex to recovering a continuous, dried plastic structure.

FIGURE 2 is a schematic side view of an embodiment of this invention in which fitted rotating rolls define a coagulating slit.

FIGURE 3 is a plan view of the rolls of FIGURE 2.

FIGURE 4 is a cross-section taken through line A—A of FIGURE 2 showing an enlarged fragmentary side view of the rolls of FIGURE 2 showing the slit formed therebetween and depicting generally the backlog of coagulum and the pool of liquid containing the mixture resulting from contacting chloroprene polymer latex with coagulating solution.

FIGURE 5 is a schematic side view of another embodiment of rolls which can be used in this invention to form a coagulating slit.

FIGURE 6 is a plan view of the rolls of FIGURE 5.

FIGURE 7 depicts an embodiment included in the present invention of elutriating the plastic coagulum structure without disruption thereof.

In FIGURE 1, the latex 1 is fed through line 29 to the feed pan 2 from which said latex overflows over the apron 3 onto coagulating roll 10. Another roll, 11, is spaced beside roll 10, both rotating in the direction shown. Rolls 10 and 11 are partly immersed in bath 4 which contains the coagulating solution 5, said rolls being wet thereby prior to application of latex 1. Coagulating solution 5 is circulated by a pump, not shown, through line 30 to the trough 12 which is bottomed by a narrow opening 13 formed at the nip between rolls 10 and 11. Fresh ingredients to keep bath 4 at constant composition are added as water solutions through lines 31 and 32 to the trough 12 between rolls 10 and 11, or preferably the fresh ingredients are added to recycle line 30 through line 31. Line 33 removes part of the coagulating solution 5 from bath 4 to keep a constant amount therein.

In FIGURES 2 and 3, is depicted one form of coagulating rolls 10 and 11. The cylindrical surface of roll 11 has a raised central portion 50 which is bounded by perpendicular edges 51 and 52 and flanked by cylindrical shanks 53 and 54. Roll 10 has a correspondingly located recessed portion 55 bounded by perpendicular edges 56 and 57 and flange portions 58 and 59, said edges 56 and 57 being spaced somewhat more widely than edges 51 and 52 of roll 11. The raised portion 50 of roll 11 and the recessed portion 55 of roll 10 approach each other to be separated by a slit or narrow adjustable opening 13 at the nip of said rolls. The surfaces of roll portions 50 and 55 are preferably treated to increase the coefficient of friction thereof with coagulum. This may be done by sand blasting said roll surfaces with 10 to 100 mesh sand or, more permanently, by making fine corrugations or knurling upon said surfaces. The knurling can be in the form of small pyramids in repeating diagonal rows.

Also in FIGURES 2 and 3, are shown end dams 60 and 61 which are flat plates of approximately triangular outline with two sides of each said dams curved to fit the cylindrical surfaces, as shown, of rolls 10 and 11. End dams 60 and 61 are held rigidly in place by external supports, not shown, with part of one face of each said dam bearing against edges 51 and 52 and their adjacent curved edges against shanks 53 and 54 of roll 11 and with the other curved edge of each said dams bearing against recessed portion 55 and part of the adjacent sides of each dam bearing against edges 56 and 57 of roll 10. FIGURE 4 shows an enlarged side view of the disposition of end dam 60. The fitted surfaces of rolls 10 and 11 thus form with end dams 60 and 61 a trough 12 which is closed during operation at the bottom at slit 13 by the coagulum passing through the nip between said rolls. In FIGURE 1, end dams are used but are omitted to show schematically the pool of liquid 7 in trough 12 resulting from the discharge from lines 30, 31, and 32 and from pan 2.

FIGURES 5 and 6 show another form of coagulating rolls which can be used in the present invention. The same numbers are used to identify features similar to those previously described. One roll, 11, is a simple cylinder which is made to fit closely between perpendicular edges 56 and 57 of roll 10, rolls 10 and 11 forming a narrow opening 13 at the nip between said rolls as in the case of the two rolls of FIGURES 2, 3, and 4. By the configuration of roll 10 in this embodiment, perpendicular edges 56 and 57 serve as end closures in the same way as end dams 60 and 61 of the previous embodiment.

Sufficient coagulating solution 5 and latex 1 are contacted to form enough coagulum to fill the slit 13 at the nip between rolls 10 and 11 to prevent uncoagulated latex 1 from passing therethrough. Not enough latex is added, however, to allow any polymer to overflow dams 60 and 61. Mixing of the coagulating solution and latex in trough 12 is accomplished in part by discharging the coagulating solution ingredients on top of the latex added to roll 10 as shown in FIGURE 1 and in part by wetting rolls 10 and 11 with coagulating solution from bath 4 or lines 30-32 prior to addition of the latex, this wetting action also serving to free the continuous sheet 6 of coagulum from said rolls below the nip. Mixing by milling takes place at the nip between rolls 10 and 11 by rotating said rolls at different surface speeds. Excessive milling, however, is undesirable since it decreases the amount of coagulum which passes through the nip. Preferably, roll 11 has a surface speed of 100–120% of that of roll 10, but 100–150% is successfully operable.

In addition to filling the nip between rolls 10 and 11, the coagulum should have a back-log in trough 12, the width at the top of said back-log preferably being at least three times the width of the slit 13 formed at the nip. The back-log of coagulum is shown generally in FIGURE 4 as the heavily shaded area 50 in trough 12 above the narrow opening 13. Because of the surprising elasticity of the coagulum, it tends to expand after passing through the nip, and hence the thickness of sheet 6 produced approaches the width dimension at the top of the back-log.

The size of the back-log depends on the nip opening between rolls 10 and 11, the rate of latex feed, the speed and roughness of said rolls, and in turn affects the thickness of the sheet 6 produced. As the back-log becomes larger, the forces directed through the nip decrease, and finally an upper limit is reached at which no sheet is produced. The size of the back-log should therefore be controlled to be below this upper limit and preferably be of such size that the width across the top of the back-log is three times the width at the nip opening or slit 13.

The rolls 10 and 11 shown in FIGURES 1 through 6 are rotated independently and in opposite directions at controlled speeds by variable speed motors connected by chain and sprocket or equivalent device, not shown. The bearing block of one of the pair of rolls is firmly fixed, while the other is finely adjustable so as to give a uniform clearance of the desired width between the rolls. The rolls 10 and 11 should be made of, or at least surfaced with, an inert material such as stainless steel or nickel.

With reference again to FIGURE 1, the stripper roll 14 carries the continuous sheet 6 of coagulated chloroprene polymer formed at the nip between rolls 10 and 11 from roll 10 and on to the squeeze rolls 15 and 16, which are preferably made of steel covered with cloth and which are rotated together under pressure and at a rate corresponding to the rate of travel of sheet 6. Water sprays S are directed against the sheet immediately as it enters and leaves rolls 15 and 16. The sheet then passes over and under guide rolls 17, 18, and 19, 18 being immersed in a water wash bath 20, and then through one or more trains (only one additional train is shown) consisting of squeeze rolls, sprays, and guide rolls, etc. like rolls 15, 16, 17, 18, 19, and bath 20 and which are identified by the same numbers. In practice, either the water sprays S or the wash bath 20 may be omitted, preferably, if any, the latter. This arrangement is representatively shown in FIGURE 7 as a single train of rolls, with similar equipment being identified by the same numbering as in FIGURE 1. Two stripper rolls 14 are employed. Water sprays S are positioned beneath sheet 6 as well as above in this embodiment. The sheet 6 finally passes through another pair of squeeze rolls 21 and 22, like rolls 15 and 16. The sheet, from which substantially all of the water soluble material has thus been removed, is now dried by passage through drier 40 which can be of the type employing passage over one or more girt conveyors 41 past a series of gas-fired infrared heaters 42.

The theory of operation in the preferred embodiment of the present invention is to partially coagulate latex upon the surface of one or both of adjacent rolls spaced like rolls 10 and 11, followed by completion of the coagulation and formation of a uniform sheet in the nip between the rolls. The coagulant is brought into good contact with the uncoagulated latex as a result of a slight milling action at the nip, and the coagulation is thus completed. At the same time the coagulum passing between the rolls is given a thickness which is uniform and great enough for subsequent handling but small enough to make washing and drying easy. At the same time, the resulting continuous sheet of coagulum is given a predetermined uniform width by end dams or flanges associated with the rolls, which also form the trough in which the coagulant is brought into final contact with the latex. The sliding of the end dam and flange against the opposing wall keeps them free from coagulum and thus keeps the edge of the sheet from becoming ragged. The continuous sheet remains intact throughout the processing, being subjected to only a slight milling action during its formation and to a simple squeezing between rolls when the liquid phase is removed.

The equipment and process previously described can be varied in many ways without exceeding the scope of the invention. For example, the rolls 10 and 11 may be of unequal diameters, the latex may be applied to both rolls and may be applied as a spray. It is not necessary that said rolls be partly immersed in bath 4, which is then used only to collect the coagulating solution for return to the nip. The rolls 10 and 11 are kept cleaner by non-immersion arrangement. One or more of the make-up solutions may be directly added to the bath 5. A knife may be provided for removing the film from roll 10 but is usually unnecessary. The solution squeezed from the coagulated sheet by the first set of squeeze rolls 15 and 16 may be returned to bath 5. The coagulating and washing operations may be carried out at any temperature between 0 and 100° C. but operation between 20 and 40° C. is usually most convenient. FIGURE 1 provides for applying water as a spray through sprays S to the sheet 6 immediately on entering and leaving the squeeze rolls 15 and 16 and also for soaking the sheet in water in bath 20. Either method of applying the water may be used alone and ordinarily the spray is sufficient and most convenient, as outlined in FIGURE 7.

Drying by infrared radiation, as described, in combination with flowing cool air to give a sheet temperature of between 100–160° C. is preferred. However, drying with hot air alone may be used. If the polymer is low-melting, the washed sheet may be melted in thin layers on a conventional drum dryer, and removed as a dried viscous liquid. See U.S. Patent No. 2,887,787. In either method, the drying temperature should not exceed 135° C., except for very short exposure.

The chloroprene polymers to which the present invention is applied may vary greatly in viscosity and plasticity from those which are scarcely plastic enough to be usefully processed after drying to those which are too plastic to be dried at elevated temperatures but are still firm enough to form self-supporting sheets at ordinary temperatures. The latter may be dried for example by a current of air at low temperatures or by melting and exposure in thin films to drying conditions as described above. The plastic or plasticizable polymers processed in the present invention may be made in the presence of any of the chain terminating or other modifying agents known in the art, particularly aliphatic mercaptans, iodoform, sulfur, and the dialkyl xanthogen disulfides. The chloroprene polymers processed include polychloroprene and copolymers thereof containing minor amounts (less than 50% of the total) of other copolymerizable monomers such as styrene, acrylonitrile, and 2,3-dichlorobutadiene-1,3.

The latex of the chloroprene polymer may be any which is capable of rapid coagulation to a self-supporting film by means of an aqueous coagulating solution. Chloroprene polymers are usually dispersed by the water-soluble salts of water-insoluble carboxylic acids of the aliphatic and cyclo-aliphatic series commonly derived from fats, fatty oils, and resins. The latex used should ordinarily be free from acid stable dispersing agents and stabilizers. The following examples use the sodium salt of disproportioned rosin, which is typical of the other dispersing agents such as the sodium and potassium salts of rosin, hydrogenated rosin, tall oil acids, and oleic acid used in making dispersions of chloroprene polymers. The concentration of chloroprene polymer in the latex is generally between 25 and 50% by weight.

The alkalinity of the latex, when the dispersing agent is a salt of a water insoluble carboxylic acid, before mixing with the coagulant is important when an isolated product completely soluble in aromatic hydrocarbons is desired. In this case the pH should be below 8.5. The high pH of the latex as usually made may be reduced by partial neutralization with acids. Carbon dioxide is preferred for this purpose because it is cheap and easy and safe to use, since, quite unexpectedly, an excess causes no precipitation. The coagulating agent particularly suited to these lattices is an aqueous solution containing 0.15 to 0.50% by weight of water-soluble calcium salt, preferably the chloride, 0.05 to 0.15% of hydroxyethyl cellulose, and enough acid, preferably hydrochloric, to maintain a pH below about 6.5 during coagulation.

The following examples are representative of the process of the invention in which although polychloroprene is used, copolymers thereof of the type previously described are equally applicable. Similarly, the process of this invention is applicable to coagulating solutions other than used in the examples, and accordingly, this invention is not limited to these coagulating solutions. Parts and percents are by weight unless otherwise indicated.

*Example 1*

Polychloroprene dispersion is made by dissolving three parts by weight of disproportionated rosin and 0.25 part of dodecyl mercaptan in 100 parts of chloroprene, dispersing this in 118 parts of water containing 0.63 part of sodium hydroxide (to form the sodium salt of the disproportionated rosin and to leave a slight excess of alkali) and 0.34 part of sodium sulfite and then polymerizing at 40° C., with the addition of potassium persulfate and the sodium salt of anthraquinone beta sulfonic acid as required to maintain a convenient rate of polymerization until about 70% of the chloroprene has been polymerized. The polymerization is then stopped by adding paratertiarybutyl catechol and thiodiphenylamine. The unpolymerized chloroprene is removed by steam distillation at reduced pressure.

This latex is processed in the equipment shown in FIGS. 1–4 and 7. The rolls 10 and 11 are 12 inches in diameter, the distance between the dams 60 and 61 is 10 inches, and the adjustable slit 13 or clearance at the nip between said rolls is set at 0.01 inch or 10 mils. The roll 10 to which the latex is applied has a roughened recessed portion 50, 50 mils deep and rotates at a peripheral speed of 25 feet per minute. Roll 11 has a mating roughened raised portion 55 which is 50 mils high and rotates at 29 feet per minute.

The latex is introduced into pan 2 and over apron 3 so as to furnish 94 lbs. of polychloroprene per hour. Fresh hydrochloric acid as a 10% solution is added to the recycle line 30 through line 31 at a rate of 0.17 lb. of hydrogen chloride per hour. The calcium chloride is added at 1.1 lbs. per hour and the hydroxyethyl cellulose at 0.056 lb. per hour both as aqueous solutions through line 32. The coagulum formed completely fills the nip between the rolls and forms a bank or back-log of about 30 mils wide at the top.

The coagulation bath 4, after coagulation has proceeded long enough to establish equilibrium, contains 0.20% by weight of calcium chloride, 0.63% sodium chloride formed from the acid and salt, and 0.05% of hydroxyethyl cellulose and has a pH between 6.0 and 6.4 and a Brookfield viscosity of four centipoises. Part of this solution is removed through line 33 at a rate of about 25 lbs. per hour.

A continuous sheet 6 of coagulum 28 mils thick leaves the bath over roll 14 at the rate of 18 feet per minute and contains about 150 lbs., per 100 lbs. of dry polychloroprene, of aqueous solution of approximately the same composition as the bath 5. It then passes between even speed, cloth-covered rolls 15 and 16 operating at the same linear speed of 18 feet per minute and squeezed towards one another by pneumatic cylinders with a force of 3000 lbs. The moisture content is thus reduced to about 90 lbs. per 100 polychloroprene. The compressed sheet 6 as it enters and leaves the rolls is thoroughly exposed to sprays of fresh water from sprays S and then passes over guide roll 17, under roll 18, which in this run is simply another guide roll (see FIGURE 7), not immersed in bath 20, and then over guide roll 19 to another pair of squeeze rolls the same as rolls 15 and 16. The sheet then passes through two more sets of washing equipment followed by final squeeze rolls 21 and 22, from which it emerges with the water content reduced to 30%, the sodium ion content 0.05% and the chloride ion content, representing both sodium chloride and calcium chloride, 0.1%.

The sheet 6 then passes through the drier 40 as in FIGURE 1, the essential parts of which are a series of vertical banks of infrared heaters 40 and conveyors 41 composed of girts on endless belts. These heaters are commercially available ceramic grids 6 by 8 inches and gas-heated to about 900° C. and giving a radiation of wave length mostly between one and three microns. The sheet carried on conveyors 4 passes 6 inches from the heaters and is kept between 100 and 160° C. by a current of cooler air, which also assists in drying. The sheet leaving the drier contains less than 1% water and is very light in color. The sheet is then compressed into a continuous rope which is then cut into pieces of convenient length and packaged, using the equipment described in U.S. Patent No. 2,349,829.

The material thus obtained is within the specifications required for regular commercial production of polychloroprene in plasticity and in the modulus, tensile strength, elongation at break, water swell, and scorch time of the compounded and cured elastomer. It contains the calcium salts of the acids of the original disproportionated rosin. These salts act as stabilizers.

In the above example, the rolls 10 and 11 are partly immersed in bath 4 as shown in FIG. 1. When the rolls are operated above the level of the bath, they function in the same way but require less cleaning.

*Example 2*

The coagulation process in Example 1 is repeated, using the same latex and equipment, with the distance between the rolls reduced to 5 mils. The best latex feed rate is found to correspond to 79 lbs. of polychloroprene per hour and the rates of feed of the coagulant ingredients are adjusted proportionately. The resulting uniform sheet is 16 mils thick and moves at 25 feet per minute. The other operating conditions and the quality and composition of the sheet are as in Example 1.

*Example 3*

The coagulation step of Example 1 is repeated with the rolls 10 and 11 set 15 mils apart. The latex feed requirement for best operation corresponds to 132 lbs. of polychloroprene per hour. The resulting uniform sheet is 36 mils thick and travels at 15 feet per minute. The sheet is as in Examples 1 and 2.

*Example 4*

The coagulation step of Example 1 is repeated, with the roll 11 turning with a peripheral speed of 40 feet per minute and roll 10, 35 feet per minute. The latex feed is increased to 187 lbs. of polychloroprene per hour. The resulting uniform sheet is 22 mils thick and travels at 22 feet per minute.

The sheet is as in Examples 1 and 2.

*Example 5*

The latex used in the above examples is first treated with carbon dioxide until the pH is reduced from 12 to 8.4, requiring about 0.4 lb. of gas per 100 lbs. of polychloroprene. It is then coagulated as in Example 1, except that only 0.69 lb. of calcium chloride per hour is required to completely coagulate the sheet. The bath composition at equilibrium is as in Example 1, however. The coagulated sheet is washed and dried as in Example 1 and gives a similar product with plasticity and vulcanizate properties within the established specifications. In addition, unlike the product obtained in the other examples, it is completely soluble in aromatic solvents without any residue of gel and gives a solution of the same viscosity as that of a solution of the same concentration of a polychloroprene isolated by coagulation by freezing.

*Example 6*

Example 5 is repeated, with the following changes. The latex is fed at a rate of 124.5 lbs. of polychloroprene per hour. Hydrogen chloride (0.18 lb.), calcium chloride (0.64 lb.), and hydroxyethyl cellulose (0.06 lb.), each on the basis of 100 lbs. of polychloroprene are added as aqueous solutions, which are first mixed and then added through line 32 directly to the nip between rolls 10 and 11 in a manner to distribute the solution along the length of the trough 12. This gives (with the latex at pH 8.4) a pH of 6.3 in the nip and 6.4 in the bath. The calcium chloride concentration is 0.216 in the nip and 0.186 in the bath. The nip opening is 20 mils and the rolls rotate at a peripheral speed of 19 and 20 feet per minute, giving a sheet 55 to 65 mils thick moving at 13 feet per minute. This is dried as in Example 5, giving a very similar product to that obtained in Example 5.

Although rolls 10 and 11 have been used as the rotating members, it is contemplated that in the light of the present teaching, other devices which comprise sidewalls that move along a path and which converge across the width thereof to form a slit across said path will work, such as, for example, two endless belt conveyors spaced to form a slit or nip therebetween. Such devices are to be included within the scope of this invention.

As many apparently widely different embodiments of this invention may be made without departing from the spirit and scope thereof, it is to be understood that this invention is not limited to the specific embodiments thereof except as defined in the appended claims.

What is claimed is:

1. A process which comprises rotating in opposite directions two cylindrical members which are horizontally spaced to form a narrow opening at the nip therebetween and having roughened cylindrical surfaces, the directions of said rotation being to move from above said nip to below and with the surface speed of one of said members being greater than but within 150% of the surface speed of the other of said members, applying at least some coagulating solution to said cylindrical members to cause wetting thereof, applying chloroprene polymer latex and additional coagulating solution to at least one of said wet cylindrical members in an amount sufficient to form a back-log of coagulum above said nip, with said back-log being laterally confined at the ends of said narrow opening, passing the mixture resulting from the two previous applying steps through said nip, with said back-log being of such size as to permit said resulting mixture to pass through said nip and having a width across its top of at least three times the width of said narrow opening, thereby obtaining a continuous structure of coagulated chloroprene polymer therefrom and subsequently, washing and drying said continuous structure.

2. The process of claim 1 wherein the washing step includes maintaining the coagulated chloroprene polymer in the configuration obtained, repeatedly squeezing said configuration, and immediately prior to and subsequent to each said squeezing, contacting said configuration with wash water.

3. A process which comprises applying polychloroprene latex and coagulating solution to the nip between two cylindrical members having roughened cylindrical surfaces and which are rotating in the direction from above said nip to below and which are horizontally spaced to form a narrow opening at said nip, with the surface of said members being wet with coagulating solution prior to the applying step and with the surface speed of one of said members being greater than but within 150% of the surface speed of the other of said members, said latex and solution being applied in an amount sufficient to form a back-log of coagulum above said nip, with said back-log being laterally confined at the ends of said narrow opening, passing the mixture resulting from the applying step through said nip, with said back-log being of such size as to permit said resulting mixture to pass through said nip and having a width across its top of at least three times the width of said narrow opening, thereby obtaining a continuous structure of coagulated polychloroprene therefrom, and subsequently, washing and drying said continuous structure.

4. The process of claim 3 wherein after emerging from said nip, said continuous structure is contacted with additional coagulating solution.

5. The process of claim 3 wherein said coagulating solution is discharged on top of said latex.

6. The process of claim 3 wherein said coagulating solution is an aqueous solution containing from 0.15 to 0.50% by weight of water-soluble calcium salt, 0.05 to 0.15% by weight of hydroxyethyl cellulose, and sufficient hydrochloric acid to maintain the pH thereof below 6.5.

References Cited by the Examiner

UNITED STATES PATENTS

| | | | |
|---|---|---|---|
| RE 21,090 | 5/39 | Shepherd | 264—215 |
| 2,163,986 | 6/39 | Shepherd | 264—215 |
| 2,187,146 | 1/40 | Calcot et al. | 264—215 |
| 2,814,550 | 11/57 | Gunderman et al. | 264—184 |
| 2,880,466 | 4/59 | Gunderman et al. | 264—216 |
| 2,923,979 | 2/60 | Kalil | 18—57 |

FOREIGN PATENTS

| | | |
|---|---|---|
| 111,530 | 9/40 | Australia. |
| 621,041 | 5/61 | Canada. |

ALEXANDER H. BRODMERKEL, *Primary Examiner.*